(12) United States Patent
Wakumoto et al.

(10) Patent No.: US 8,964,746 B2
(45) Date of Patent: Feb. 24, 2015

(54) TRANSMITTING A PACKET FROM A DISTRIBUTED TRUNK SWITCH

(75) Inventors: Shaun Wakumoto, Roseville, CA (US); Bruce E. Lavigne, Roseville, CA (US); Robert L. Faulk, Jr., Roseville, CA (US); Mark A. Tassinari, Loomis, CA (US); Mark Gooch, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 550 days.

(21) Appl. No.: 12/032,280

(22) Filed: Feb. 15, 2008

(65) Prior Publication Data

US 2009/0207834 A1    Aug. 20, 2009

(51) Int. Cl.
*H04L 12/28* (2006.01)
*H04L 12/801* (2013.01)
*H04L 12/803* (2013.01)

(52) U.S. Cl.
CPC .............. *H04L 47/10* (2013.01); *H04L 47/125* (2013.01)
USPC ............ 370/392; 370/401; 370/419; 370/428

(58) Field of Classification Search
USPC .................... 370/389, 392, 397, 399, 395.31, 370/395.32, 395.7
See application file for complete search history.

(56) References Cited

U.S. PATENT DOCUMENTS

| | | | | |
|---|---|---|---|---|
| 5,852,630 A | * | 12/1998 | Langberg et al. | 375/219 |
| 6,807,182 B1 | * | 10/2004 | Dolphin et al. | 370/401 |
| 7,383,353 B2 | * | 6/2008 | Valdevit et al. | 709/241 |
| 2004/0037278 A1 | * | 2/2004 | Wong et al. | 370/389 |
| 2008/0069114 A1 | * | 3/2008 | Shimada | 370/395.31 |

* cited by examiner

*Primary Examiner* — Alvin Zhu
(74) *Attorney, Agent, or Firm* — Brooks, Cameron & Huebach; Randy Noranbrock

(57) ABSTRACT

A method of transmitting an upstream communication packet from a distributed trunk (DT) switch is described. The method comprises receiving a packet from a device connected to a DT port of the DT switch; and transmitting the received packet via a non-DT port of the DT switch if the DT switch is the owner of the device and transmitting the received packet via a DT interconnect (DTI) port of the DT switch if the DT switch is not the owner of the device.

19 Claims, 9 Drawing Sheets

TRANSMITTING A PACKET FROM A DISTRIBUTED TRUNK SWITCH

RELATED APPLICATION

The present application is related to co-pending application entitled, "Transmitting A Packet From A Distributed Trunk Switch," having application Ser. No. 11/680,095 and co-pending application entitled, "Transmitting A Packet From A Distributed Trunk Switch," having application Ser. No. 11/680,089, each assigned to the same assignee, each filed on Feb. 28, 2007, and each of which are hereby incorporated by reference herein in their entirety.

BACKGROUND

Trunking enables the connection of two networked devices together using multiple links between the devices. Using multiple links provides for greater redundancy, e.g., if one of the links fails, the other link may be used. Additionally, multiple links may provide greater bandwidth between the devices and may provide load balancing over the connecting links.

FIG. 1 depicts a high-level block diagram of trunking in use connecting two devices, i.e., a first device 100 such as a switch or a server or other networked device, and a trunk switch 102 able to communicate over either link connecting the two devices. A pair of communication links 104, 106 communicatively connect device 100 and trunk switch 102 to each other. Communication links 104, 106 connect to trunk ports 108, 110, respectively, at trunk switch 102. The pair of communication links 104, 106 are collectively referred to as a trunk 112 (dashed line) connecting device 100 and trunk switch 102.

Assuming device 100 is a switch, FIG. 1 depicts two switches connected via a two-port trunk 112. Specifically, ports 114, 116 connect respectively to trunk ports 108, 110 of trunk switch 102 via links 104, 106. Trunk switch 102 transmits a unicast packet, i.e., a packet sent from one device to one other device, to device 100 by selecting a single link of 104, 106 over which to forward the packet to the device. If trunk switch 102 were to instead transmit the packet on both ports, then device 100 would receive two copies of the same packet and forward both copies, e.g., to downstream-connected devices, thereby increasing, by duplication, the traffic on the network.

The selection of which port to use for forwarding packets is based on the traffic content. Trunk switch 102 performs a hash on several attributes within the particular packet to be forwarded. For example, trunk switch 102 may perform a logical XOR of the source and destination media access control (MAC) addresses and performs a modulus of the hash result based on the number of ports in the trunk, e.g., two ports with respect to trunk 112. Other attributes used during the hash may comprise an Internet protocol (IP) address, a transmission control protocol/user datagram protocol (TCP/UDP) port number, etc.

A type of switch which forwards packets based on a MAC layer address is a layer 2 switch. A feature of a layer 2 switch is that the switch keeps track of the source MAC addresses of received packets and the particular port on which the packet is received. For example, if device 100 transmits traffic, e.g., a communication packet, to trunk switch 102 using link 104 (and which is received at port 108 of the trunk switch), the trunk switch tracks that the device is reachable via trunk (logical port) 112. Trunk switch 102 transmits subsequently received transmissions destined for device 100 by using logical port 112, i.e., one of ports 108, 110.

DESCRIPTION OF THE DRAWINGS

One or more embodiments of the present invention are illustrated by way of example, and not by limitation, in the figures of the accompanying drawings, wherein elements having the same reference numeral designations represent like elements throughout and wherein.

DETAILED DESCRIPTION

Figure 1:
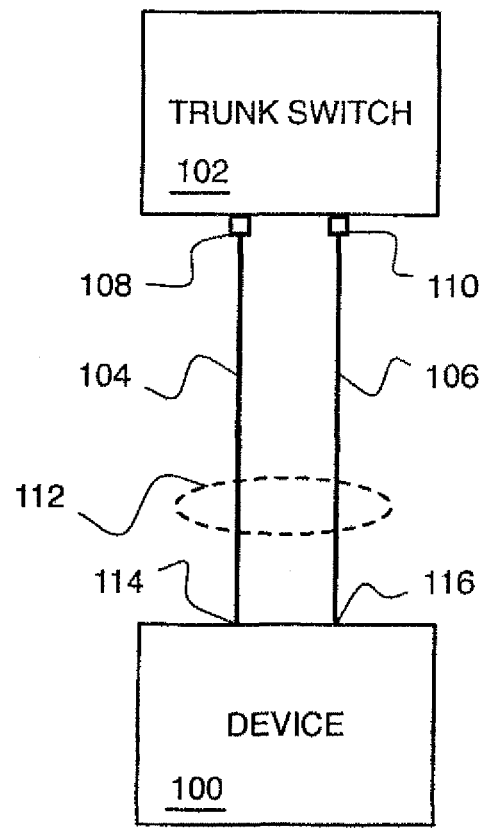
FIG. 1 is a high-level block diagram of trunking.
Figure 2:
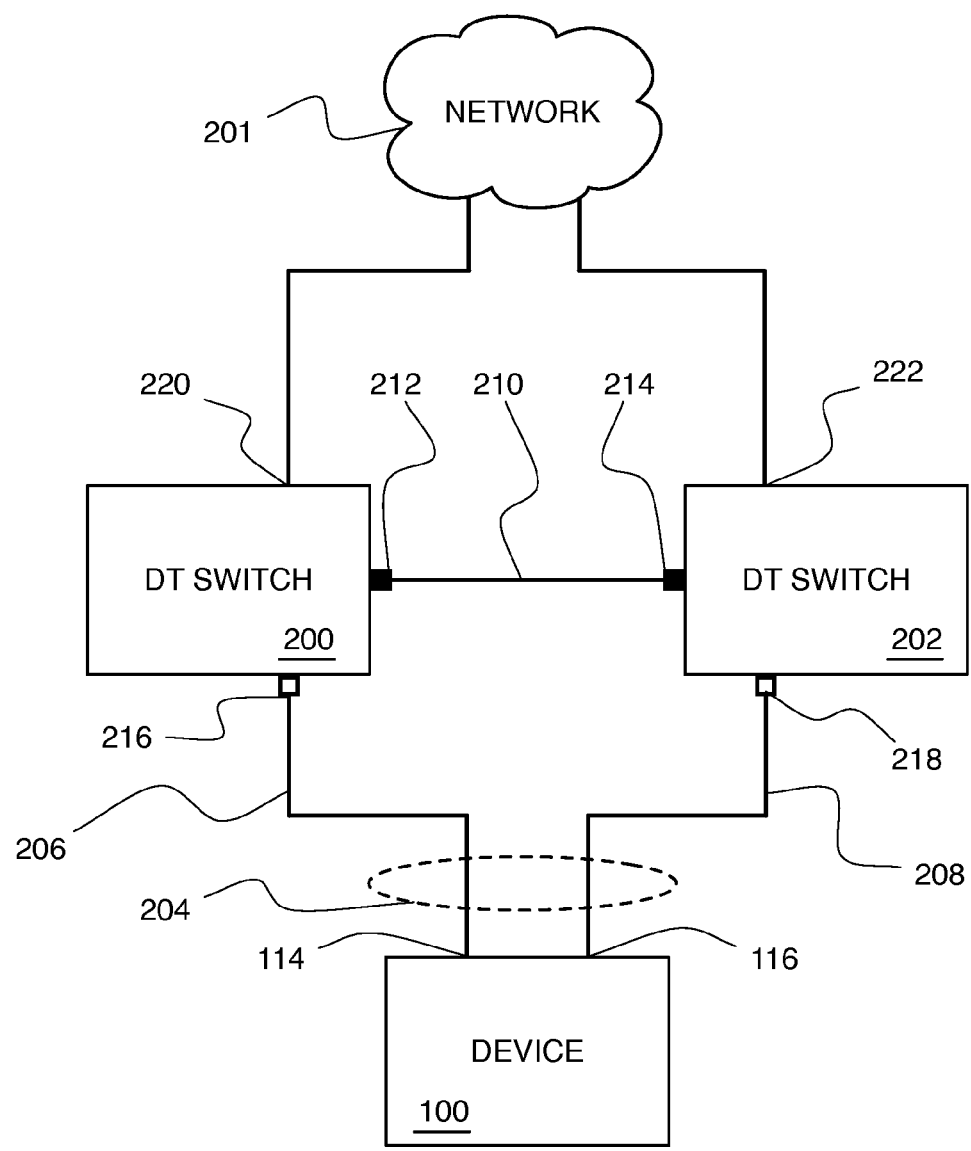
FIG. 2 is a high-level block diagram of distributed trunking according to an embodiment.

FIG. 2 depicts a particular embodiment of trunking referred to as distributed trunking. Similar to the trunking described in connection with FIG. 1, distributed trunking refers to the use of port trunking to connect a single device to two distributed trunk-capable devices, e.g., switches. In this manner, a single device, e.g., device 100, connects via distributed trunking to a first distributed trunk switch 200 and a second distributed trunk switch 202 using a distributed trunk 204 comprising links 206, 208. Distributed trunk (DT) 204 is referred to as a distributed trunk based on the distribution of links 206, 208 comprising the distributed trunk being distributed between two DT switches 200, 202. DT switches 200, 202 may be communicatively coupled with additional networked devices, e.g., switches, servers, etc. Device 100 may comprise a server and/or a switch or other networked device.

In some embodiments, device 100 is a switch connected with additional networked devices. In some embodiments, greater than two communication links may connect device 100 and DT switches 200, 202. In some further embodiments, greater than two DT switches 200, 202 may be connected with device 100 in a distributed trunking manner. In this manner, greater redundancy and/or greater bandwidth may be provided between device 100 and DT switches 200, 202. Further, if a single DT switch fails, the remaining DT switch is able to provide communication functionality for device 100. That is, DT switch 200 may handle communications to/from device 100 in the event of a failure of DT switch 202.

FIG. 2 depicts DT switches 200, 202 communicatively connected with each other via communication link 210 (also referred to as a distributed trunk interconnect (DTI) link) and each connected to a network 201. Communication link 210 connects distributed trunk interconnect (DTI) port 212 of DT switch 200 with DTI port 214 of DT switch 202. Similarly, link 206 connects port 114 of device 100 to a DT port 216 of DT switch 200 and link 208 connects port 116 of the device to a DT port 218 of DT switch 202. DT switch 200 has designated DT port 216 as a distributed trunk port to indicate that communication received/sent via the port is communicated over distributed trunk 204 connected with device 100. DT switch 202 has designated DT port 218 as a distributed trunk port to indicate that communication received/sent via the port is communicated over distributed trunk 204 connected with device 100.

Also, DT switch 200 comprises a non-DT port 220 connecting the switch to network 201 and DT switch 202 comprises a non-DT port 222 connecting the switch to the network. In at least some embodiments, the DT switches 200, 202 comprise one or more non-DT ports for connecting to one or more additional devices and/or networks.

Using distributed trunking, device 100, e.g., a server, comprises two sets of links spanning two different switches 200, 202. Distributed trunking enables device-level redundancy without requiring additional functionality on the device, e.g., device 100. In some embodiments, device 100 requires no additional drivers and/or functionality in order for the distributed trunking mechanism to operate. In particular, device 100 views DT switches 200, 202 to which the device is connected as a single virtual switch in operation providing similar functionality to the device as in FIG. 1. Distributed trunking additionally supports link aggregation control protocol (LACP) as the trunking protocol between device 100 and DT switches 200, 202. That is, DT switches 200, 202 appears as a single trunking device to device 100.

As depicted in FIG. 2, the term upstream forwarding refers to the transmission of communication packets from device 100 and below (bottom of page), if any, toward DT switches 200, 202 and network 201 and the term downstream forwarding refers to the transmission of communication packets from the DT switches and above (e.g., network 201), if any, e.g., additional devices connected with the DT switches, to the device.

In operation, DT switch 200 communicates with DT switch 202 via DTI link 210 using a predetermined DT communication protocol (DTCP). DTCP comprises communication of packets comprising information such as DT configuration information related to the configuration of DT link 204, LACP attributes such as aggregator MAC address, priority, keys, transmission interval, etc., traffic hashing/algorithms used by DT switches 200, 202, master/slave negotiation information, and DT port speed, media type, etc.

Additionally, DT switches 200, 202 communicate over DTI link 210 to maintain knowledge of addresses, i.e., MAC addresses, of device 100 connected to DT ports, e.g., 216, 218. DT switch 200 informs DT switch 202 of addresses learned via DT port 216, and vice versa, with respect to DT switch 202 and DT port 218. Further, based on knowledge that both DT switches 200, 202 are distributed trunk connected to device 100 via DT ports 216, 218, if DT switch 200 learns of an address via DT port 216, the information may be relayed to DT switch 202 to enable DT switch 202 to add the learned address as corresponding to DT port 218 based on the fact that distributed trunk 204 is connected to device 100.

For example, assuming Table 1 comprises addresses, ports, and an indication of ownership as between the DT switches of devices corresponding to the addresses known to DT switch 200, if DT switch 200 receives a packet from device 100 via DT port 216, Table 1 appears as follows:

TABLE 1

| Address | Port | Owner |
|---------|------|-------|
| Device 100 | DT Port 216 | TRUE |

After DT switch 200 "learns" of device 100 on DT port 216, the DT switch communicates the information to DT switch 202. In one embodiment, DT switch 200 transmits a signal to DT switch 202 indicating receipt of a packet from the address for device 100 over a DT port which is part of DT link 204 shared with DT switch 202. DT switch 202, by virtue of the knowledge that the information was received over DT link 204 stores the address of device 100 in a table, e.g., Table 2, comprising addresses, ports, and an ownership indication corresponding to the addresses known to DT switch 202, as follows:

TABLE 2

| Address | Port | Owner |
|---------|------|-------|
| Device 100 | DT Port 218 | FALSE |

Based on user-supplied input, DT switch 202 stores information indicating that DT port 218 corresponds to device 100. For example, at setup/configuration time, DT switch 202 is configured such that DT port 218 corresponds to DT port 216 as a distributed trunk.

According to this embodiment, DT switches 200, 202 add additional addresses and ports to Tables 1 and 2 as further packets are received, e.g., from below device 100 and/or from above the DT switches.

In at least some embodiments, the address maintained in DT switches 200, 202 is the MAC address of device 100. During operation of DT switches 200, 202, one of the DT switches is designated to control communication to/from device 100, i.e., one of the DT switches is designated as the owner of the device in order to manage communication forwarding decisions with respect to the device as between the DT switches which are part of the DT link 204. In at least some embodiments, the designation of which DT switch 200, 202 is the owner of device 100 is determined by a negotiation performed between the DT switches. In at least some other embodiments, the designation is determined as a result of configuration input, e.g., from a user, management software executing on a controller or other device, etc.

In further operation, assuming DT switch 202 is configured as a slave switch with respect to DT switch 200, if DTI port 214 fails (DTI link 210 failure), then DT switch 202 disables the corresponding DT port 218. In some embodiments, disabling of DT port 218 may be performed via either bringing down the link 208 and/or via the LACP (if LACP is the trunking protocol in use).

During operation, the DT switches 200, 202 communicate using the predetermined DTCP in order to determine that the DT link 210 is active, e.g., the DTCP is used as a heartbeat detection for the DTI link 210 and DTI ports 212, 214 (a DTI heartbeat). Also in at least some embodiments, the DT switches 200, 202 communicate with each other using a non-DT port, e.g., 220, 222, via network 201. The communication between DT switches 200, 202 via network 201 enables monitoring by each switch of the other switch, e.g., the communication transmitted from and received by the non-DT port is used as a heartbeat detection for the DT switches (a switch heartbeat). Each DT switch 200, 202 monitors the other DT switch based upon the non-DT port communication.

If the DTI heartbeat and the switch heartbeat are not detected within a predetermined amount of time, the monitoring DT switch determines that the monitored DT switch has failed. If a DT switch determines that the monitored DT switch has failed, the monitoring DT switch acquires ownership of device 100. For example, the table of addresses, ports and ownership indication is updated to indicate ownership of the devices by the monitoring switch.

If the DTI heartbeat is not detected and the switch heartbeat is detected within a predetermined amount of time, the monitoring DT switch releases ownership of device 100 and disables the DT port 218. That is, because switch 200 is the owner switch, switch 202 removes knowledge of device 100.

If the DT port of a DT switch is determined to have failed, the DT switch notifies the other DT switch and transfers ownership of device 100 to the other DT switch.

If the switch heartbeat is not detected and the DTI heartbeat is detected within a predetermined amount of time, one or more connections between DT switches 200, 202, but external of DTI link 210 between DT switches 200, 202, is determined to have failed and the existing status of the ownership of device 100 is maintained as between the DT switches.

In some embodiments, trunking may be used to comprise DTI link 210 between DT switches 200, 202, e.g., multiple communication links may make up the communicative coupling between the DT switches. According to this embodiment, each DT switch 200, 202 comprises one or more DTI ports connected to one or more corresponding communication links connecting the DT switches.

In at least one embodiment, each DT switch is paired with another DT switch, e.g., DT switches 200, 202. According to this embodiment, the paired DT switches may be DTI connected with each other without being paired to a third DT switch. One or more additional devices, e.g., device 100, may be connected to DT switches 200, 202 in a distributed trunking manner and/or via a network communication connection with one or the other of the DT switches.

In at least some embodiments, the DTI ports, e.g., DTI ports 212, 214 of the DT switches 200, 202, are members of the virtual local area networks (VLANs) configured for the DT switches. Communication packets destined for device 100 which are received by one of the two DT switches via DTI link 210 are transmitted to the device using the DT port of the receiving DT switch. Communication packets destined for device 100 which are received by one of the two DT switches via a non-DT port are forwarded to the device by the owner DT switch. In at least some embodiments, the owner DT switch applies a load balancing method to determine whether to transmit a received communication packet to device 100 using a DT port of the owner switch or to transmit the received communication packet to the device by way of the other non-owner DT switch. In at least some embodiments, a round-robin, hashing or other allocation mechanism may be used. If the particular packet is received on a non-DT port, i.e., traveling downstream toward device 100, then the packet is forwarded out one of the DT ports, i.e., DT port 216, 218, to device 100 over DT 204 according to a method and apparatus of an embodiment.

Communication packets received from device 100 which are received by the DT switch designated as the owner for the source MAC address, i.e., device 100, are transmitted upstream by the owner DT switch using a non-DT port.

Communication packets received from device 100 which are received by the DT switch which is not designated as the owner for the source MAC address are forwarded to the other DT switch (connected to DT link 204) via DTI link 210. After receipt of the forwarded communication packet, the other DT switch transmits the packet upstream using a non-DT port.

One or more of the present described embodiments describe methods for forwarding upstream and downstream communications from/to device 100 via DT link 210 and DT link 204.

Figure 3:
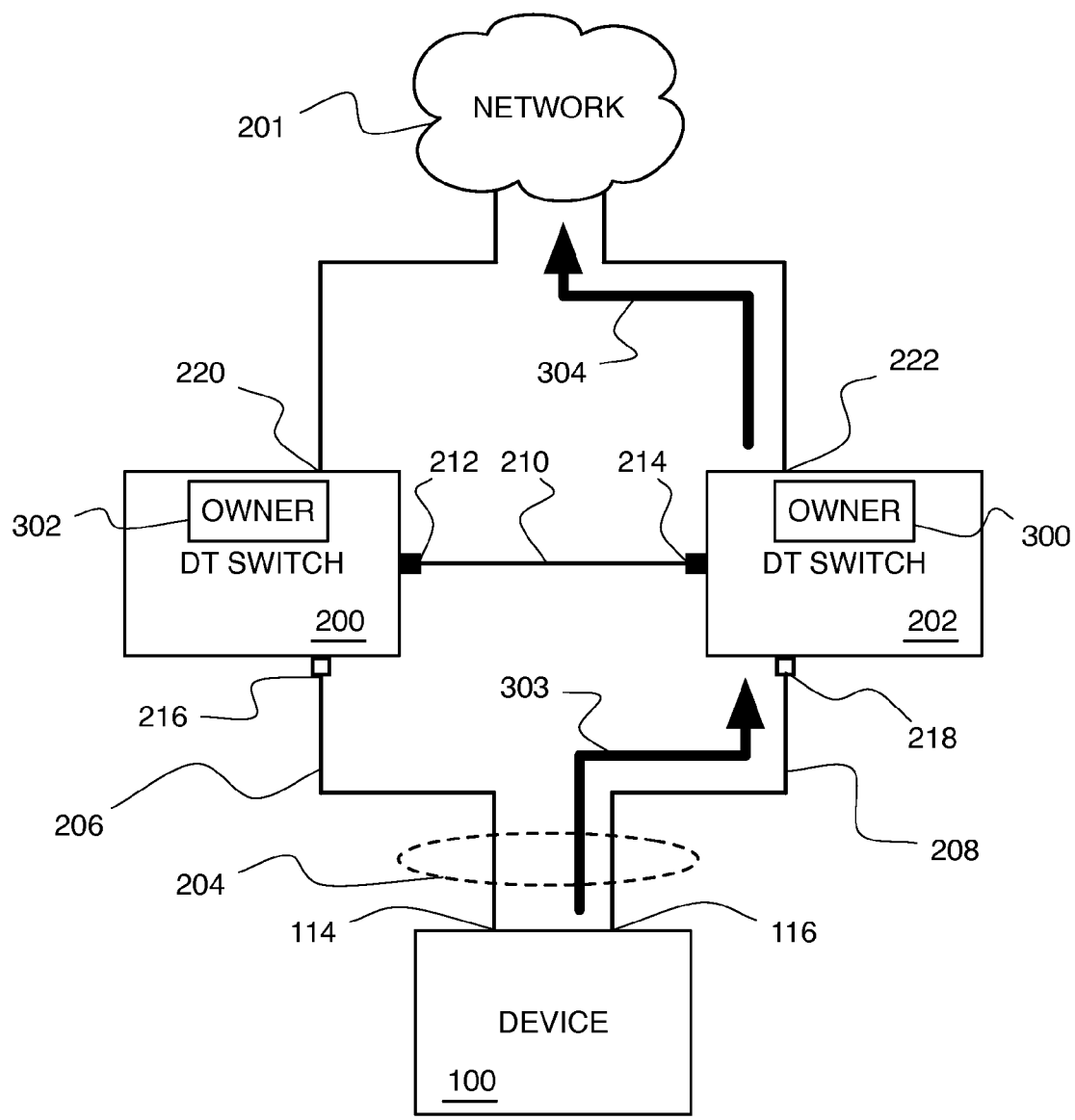
FIG. 3 is a high-level block diagram of distributed trunking for an upstream communication according to an embodiment.

FIG. 3 depicts a high-level functional block diagram of distributed trunking of upstream communication of a packet from device 100 according to an embodiment. As depicted, DT switch 202 is designated as the owner of device 100 as between DT switches 200, 202 connected to DT link 204. In at least some embodiments, DT switch 202 comprises an owner field 300 storing a value indicating the ownership of device 100 and DT switch 200 comprises an owner field 302 which does not store a value indicating ownership of device 100, i.e., owner fields 300, 302 represent a variable value maintained by corresponding DT switches 200, 202.

FIG. 3 depicts an upstream communication 303 transmitted from device 100 toward network 201 via port 116. Link 208 forms part of DT link 204 and connects the link to DT port 218 and thereby to DT switch 202. In at least some embodiments, upstream communication 303 may comprise a unicast, a multicast, and/or a broadcast communication.

In accordance with an embodiment, DT switch 202 receives upstream communication 303 and transmits the communication out non-DT port 222 as an upstream communication 304 for delivery to the destination indicated by the communication. After receipt of upstream communication 303, DT switch 202 determines whether the DT switch is the owner of device 100 connected to DT link 204 by reference to owner field 300. Because DT switch 202 is the owner, the DT switch transmits the communication out non-DT port 222.

In an embodiment in which upstream communication 303 is a unicast communication, DT switch 202 transmits the communication out a non-DT port toward the indicated destination. In an embodiment in which upstream communication 303 is a multicast or a broadcast communication, DT switch 202 transmits the communication out one or more non-DT ports. In accordance with at least some multicast or broadcast communication embodiments, DT switch 202 transmits received upstream communication 303 out non-DT port 222 to the exclusion of DTI port 214 and zero or more DT ports. In at least some embodiments, DT switch 202 does not transmit received upstream communication 303 out DTI port 214 or connected DTI link 210.

Figure 4:
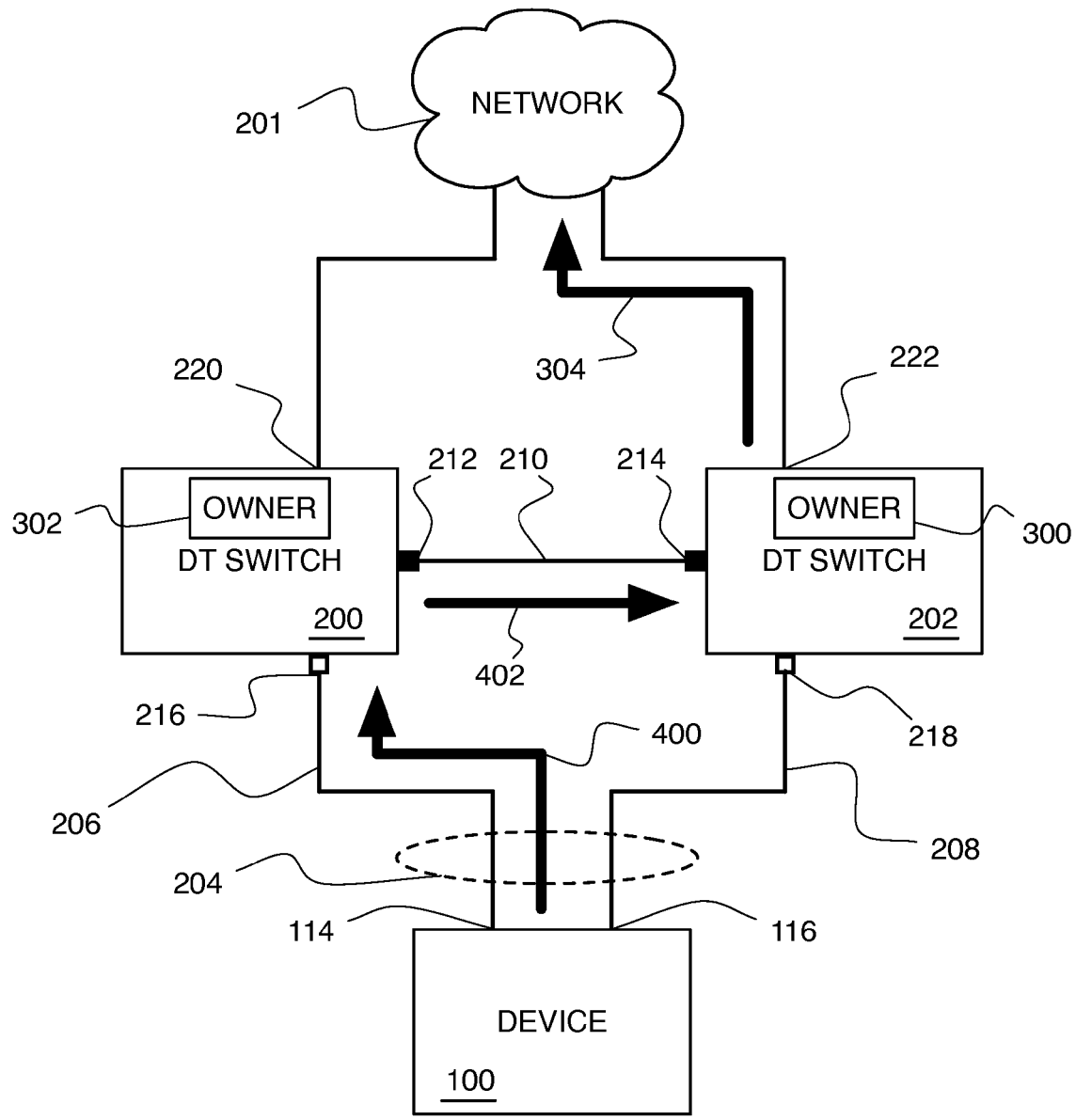
FIG. 4 is a high-level block diagram of distributed trunking for an upstream communication according to an embodiment.

FIG. 4 depicts a high-level functional block diagram of distributed trunking of upstream communication of a packet from device 100 according to an embodiment. DT switch 202 is designated as the owner of device 100 as between DT switches 200, 202 connected to DT link 204. In at least some embodiments, DT switch 202 comprises an owner field 300 indicating the ownership of device 100.

FIG. 4 depicts an upstream communication 400 transmitted from device 100 toward network 201 via port 114. Link 206 forms part of DT link 204 and connects the link to DT port 216 and thereby to DT switch 200. In at least some embodiments, upstream communication 400 may comprise a unicast, a multicast, and/or a broadcast communication.

After receipt of upstream communication 400, DT switch 200 determines whether the DT switch is the owner of device 100 connected to DT link 204 by reference to owner field 302. Because DT switch 200 is not the owner, the DT switch transmits the communication out DTI port 212 to the owner switch, i.e., DT switch 202. In accordance with an embodiment, DT switch 200 receives upstream communication 400 and transmits the communication out DTI port 212 as an upstream communication 402 for delivery to the destination indicated by the communication.

In an embodiment in which upstream communication 400 is a unicast communication, a multicast communication, or a broadcast communication and DT switch 200 is not the owner, DT switch 200 transmits the communication out a DTI port toward DT switch 202. In accordance with at least some unicast, multicast or broadcast communication embodiments, DT switch 200 transmits received upstream communication 402 out DTI port 212 to the exclusion of zero or more non-DT ports, e.g., non-DT port 220.

After receipt of upstream communication 402 by way of DTI port 214, DT switch 202 transmits the communication out non-DT port 222 for delivery to the destination indicated by the communication, i.e., upstream communication 304. In at least some embodiments, DT switch 202 need not determine whether the DT switch is the owner of device 100. In at least some embodiments, DT switch 202 determines whether the DT switch is the owner of device 100.

Figure 5:
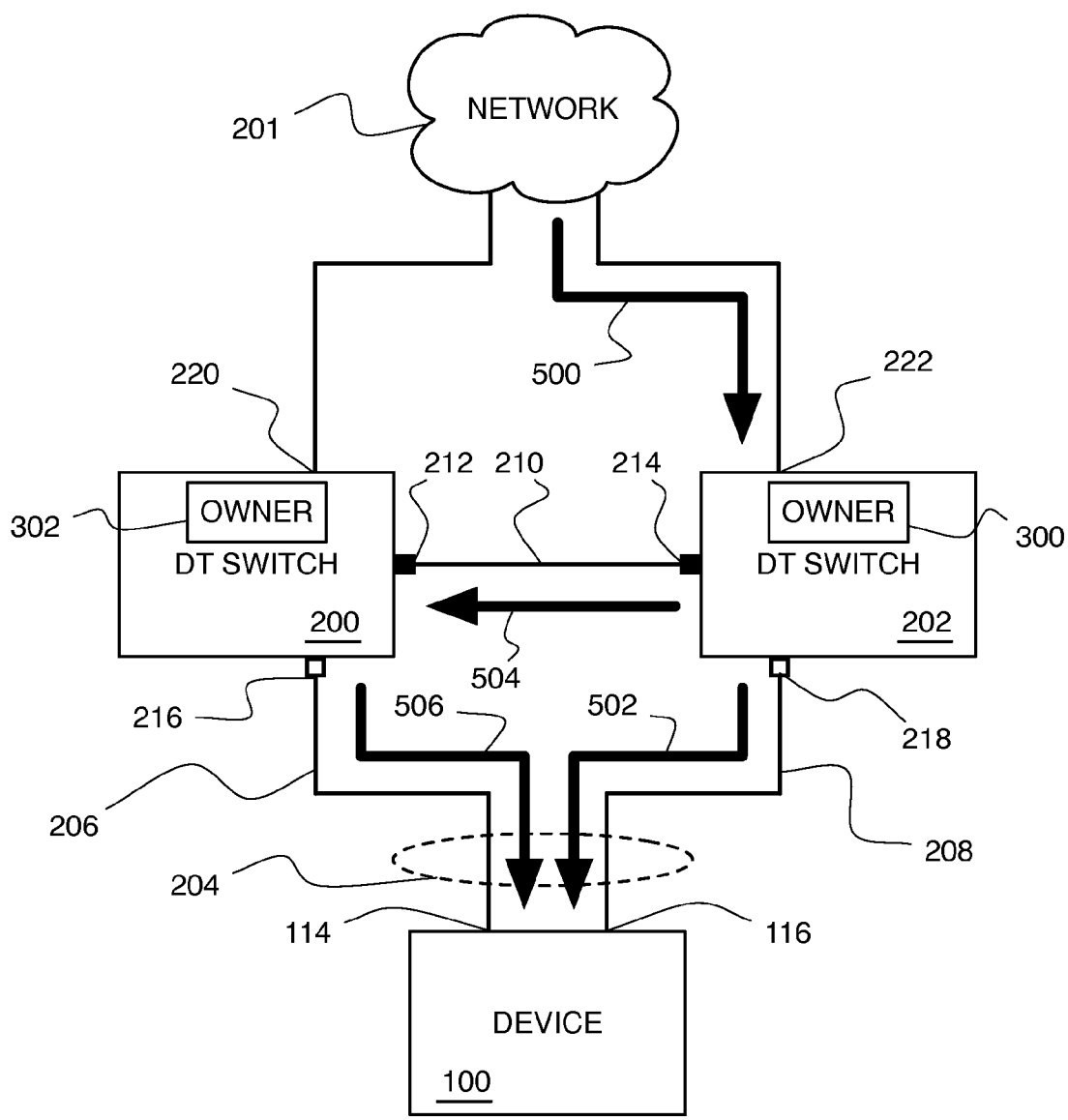
FIG. 5 is a high-level block diagram of distributed trunking for a downstream unicast communication according to an embodiment.

FIG. 5 depicts a high-level functional block diagram of distributed trunking of downstream communication of a packet from network 201 according to an embodiment. DT switch 202 is designated as the owner of device 100 as between DT switches 200, 202 connected to DT link 204. In at least some embodiments, DT switch 202 comprises an owner field 300 indicating the ownership of device 100.

FIG. 5 depicts a downstream unicast communication 500 transmitted from network 201, e.g., from a device which is communicatively connected with the network, to DT switch 202 via non-DT port 222. After receipt of downstream communication 500, DT switch 202 determines whether the DT switch is the owner of device 100 connected to DT link 204 by reference to owner field 300.

In at least some embodiments, upon receipt of downstream communication 500 and determination that DT switch 202 is the owner, the DT switch transmits the downstream communication 502 to device 100 via DT port 218 and DT link 204.

In at least some other embodiments, upon receipt of downstream communication 500 and determination that DT switch 202 is the owner, the DT switch hashes the contents of the downstream communication. Based on the hash outcome, DT switch 202 transmits the downstream communication to device 100 via either of DT port 218 or DTI port 214. That is, DT switch 202 retransmits downstream communication 500 as either downstream communication 504 via DTI port 214 or downstream communication 502 via DT port 218 depending on the hash outcome. In this manner, DT switch 202 is able to load balance downstream communication transmitted to device 100 across DTI link 210 and link 208. If DT switch 202 retransmits downstream communication 500 as downstream communication 504 via DTI port 214, DT switch 200 retransmits the communication as downstream communication 506 to device 100 via DT port 216.

Figure 6:
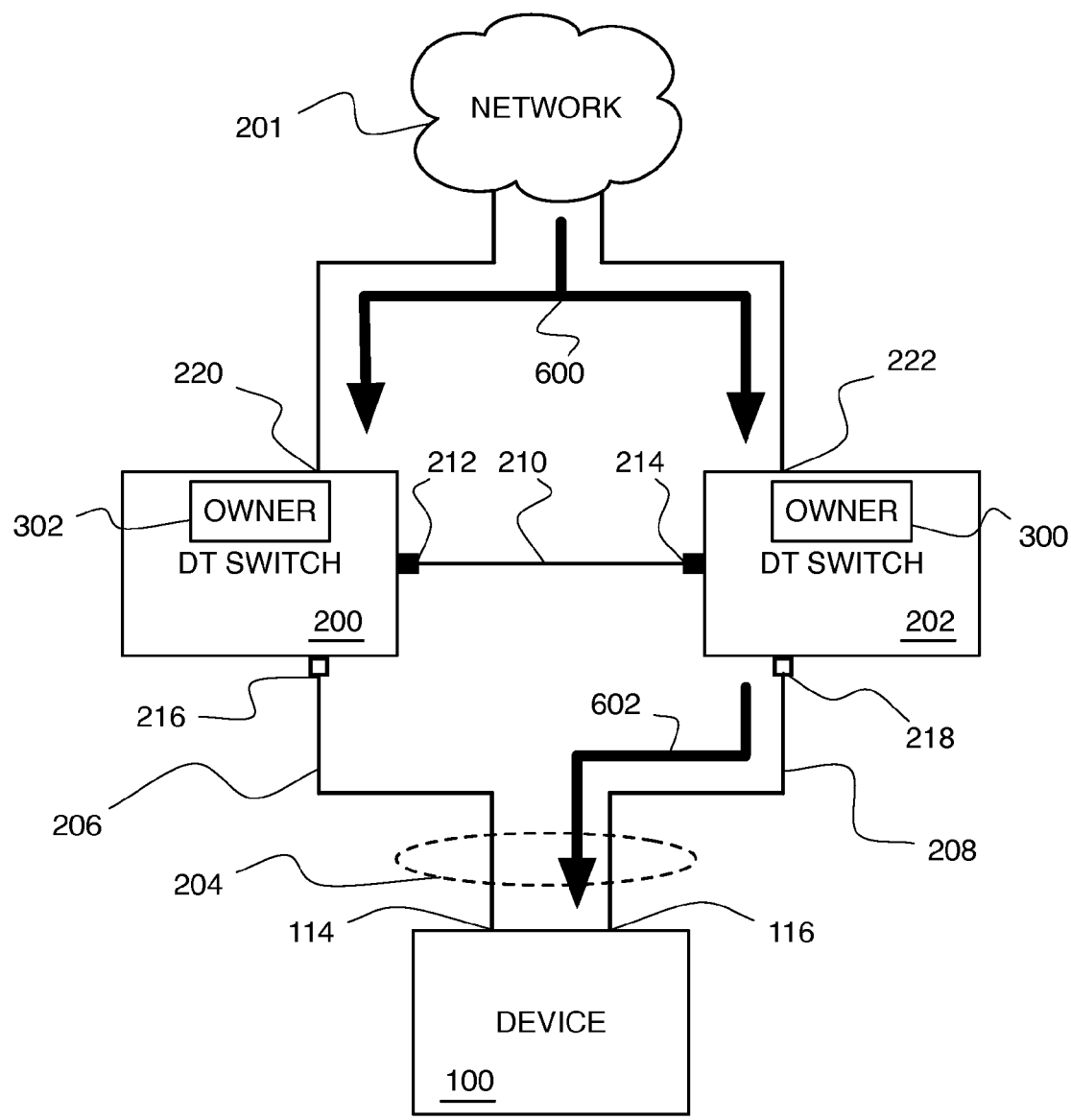
FIG. 6 is a high-level block diagram of distributed trunking for a downstream multicast or broadcast communication according to an embodiment.

FIG. 6 depicts a high-level functional block diagram of distributed trunking of downstream communication of a packet from network 201 according to another embodiment. DT switch 202 is designated as the owner of device 100 as between DT switches 200, 202 connected to DT link 204. In at least some embodiments, DT switch 202 comprises an owner field 300 indicating the ownership of device 100 by DT switch 202 and DT switch 200 comprises an owner field 302 which does not indicate ownership of device 100 by DT switch 200.

FIG. 6 depicts a downstream multicast or broadcast communication 600 transmitted from network 201, e.g., from a device which is communicatively connected with the network, to DT switch 202 via non-DT port 222 and DT switch 200 via non-DT port 220. After receipt of downstream communication 600, DT switch 202 and DT switch 200 each determine whether one of the DT switches is the owner of device 100 connected to DT link 204 by reference to owner field 300 and owner field 302, respectively.

Based on the result of the owner determination by DT switches 200, 202, DT switch 202 as the owner of device 100 retransmits the downstream communication 600 as downstream communication 602 to the device via DT link 204. DT switch 200, which is not determined to be the owner of device 100, does not retransmit downstream communication 600. In at least some embodiments, DT switches 200, 202 comprise more than one non-DT port 220, 222, respectively, and responsive to receipt of the downstream multicast or broadcast communication 600, the DT switches retransmit the downstream communication via the additional non-DT ports.

Figure 7:
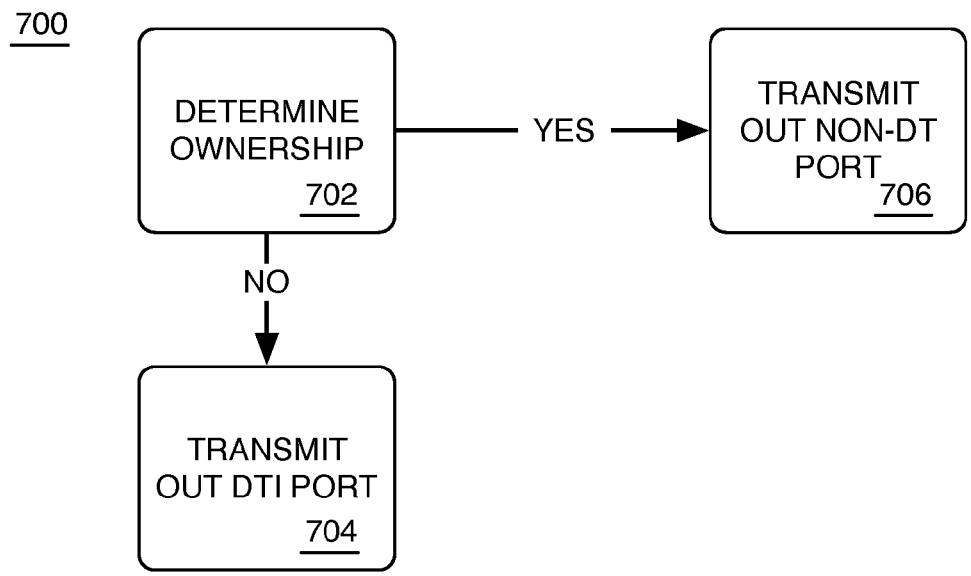
FIG. 7 is a high-level process flow diagram of a portion of a method for an upstream communication according to an embodiment.

FIG. 7 depicts a high-level process flow diagram of a portion 700 of a method of routing an upstream communication by a DT switch based on receipt of a packet from device 100, i.e., receipt of a packet from a DT port. At functionality 702, the DT switch determines whether the DT switch is the owner of device 100, e.g., by comparison with an owner field. If the DT switch is not the owner, the flow proceeds to functionality 704. During execution of functionality 704, the DT switch retransmits the received upstream communication out a DTI port to the other connected DT switch. If the DT switch is the owner, the flow proceeds to functionality 706 wherein the DT switch retransmits the received upstream communication out zero or more non-DT ports.

A similar process flow applies to routing an upstream communication by the DT switch based on receipt of a packet from the DTI port. That is, the DT switch determines whether the switch is the owner and if the switch is the owner, then the DT switch retransmits the received communication out an appropriate non-DT port toward the destination of the communication. However, if the DT switch is not the owner and the upstream communication was received via the DTI port, the DT switch does not retransmit the upstream communication.

Figure 8:
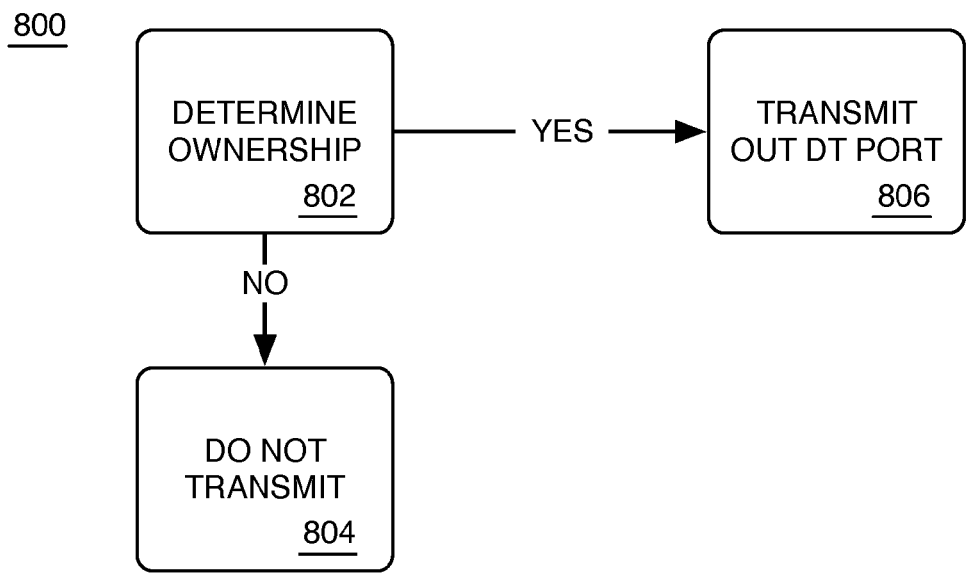
FIG. 8 is a high-level process flow diagram of a portion of a method for a downstream communication according to an embodiment.

FIG. 8 depicts a high-level process flow diagram of a portion 800 of a method of routing a downstream communication by a DT switch based on receipt of a packet destined for device 100, i.e., receipt of a packet from a non-DT port. At functionality 802, the DT switch determines whether the DT switch is the owner of device 100, e.g., by comparison with an owner field. If the DT switch is not the owner, the flow proceeds to functionality 804 and does not retransmit the communication, i.e., does not transmit the packet out a DT port. If the DT switch is the owner, the flow proceeds to functionality 806 and retransmits the communication out the appropriate DT port. In at least some embodiments, if the downstream communication is a broadcast or multicast communication, the DT switch in functionality 806 retransmits the downstream communication on each DT port corresponding to a device owned by the DT switch and the non-DT ports.

Figure 9:
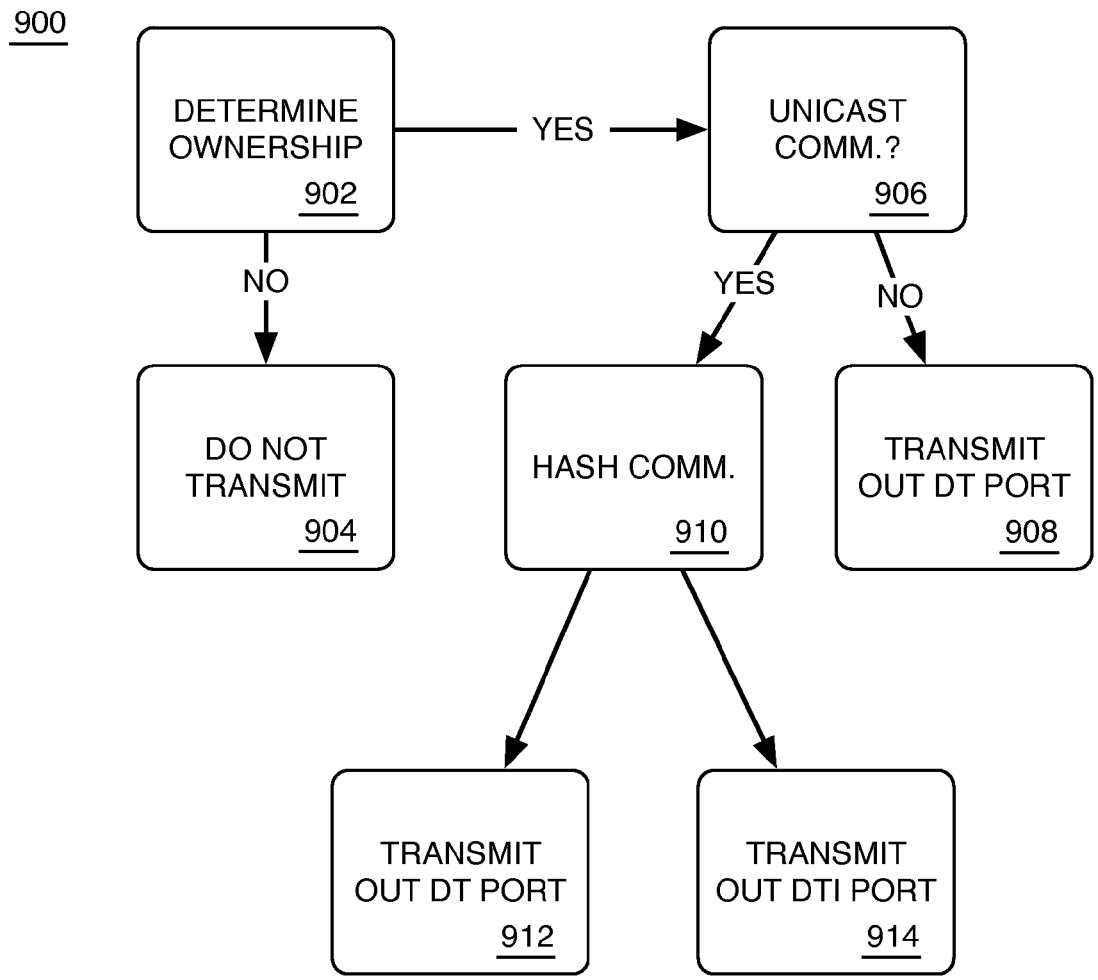
FIG. 9 is a high-level process flow diagram of a portion of another method for a downstream communication according to another embodiment.

FIG. 9 depicts a high-level process flow diagram of a portion 900 of another method of routing a downstream communication by a DT switch based on receipt of a packet destined for device 100, i.e., receipt of a packet from a non-DT port. At functionality 902, the DT switch determines whether the DT switch is the owner of device 100, e.g., by comparison with an owner field. If the DT switch is not the owner, the flow proceeds to functionality 904 and does not retransmit the communication.

If the DT switch is the owner, the flow proceeds to functionality 906 and determines whether the downstream communication is a unicast communication. If the downstream communication is not a unicast communication, the flow proceeds to functionality 908 and the DT switch retransmits the downstream communication to to the DT port corresponding to the device owned by the DT switch to which the communication is directed. In at least some embodiments, the DT switch in executing functionality 908 retransmits the downstream communication on each DT port corresponding to a device owned by the DT switch.

If the downstream communication is a unicast communication, the flow proceeds to functionality 910 and the DT switch hashes at least a portion of the downstream communication. based on the result of the hash of functionality 910, the flow proceeds to either functionality 912 or functionality 914 in order to load balance the downstream retransmission. If the flow proceeds to functionality 912, the DT switch retransmits the downstream communication out the DT port corresponding to the device to which the communication is directed. If the flow proceeds to functionality 914, the DT switch retransmits the downstream communication out the DTI port to the other connected DT switch. Upon receipt of the downstream unicast communication over the DTI port, the other connected DT switch retransmits the downstream unicast communication to the device to which the communication is directed.

Figure 10:
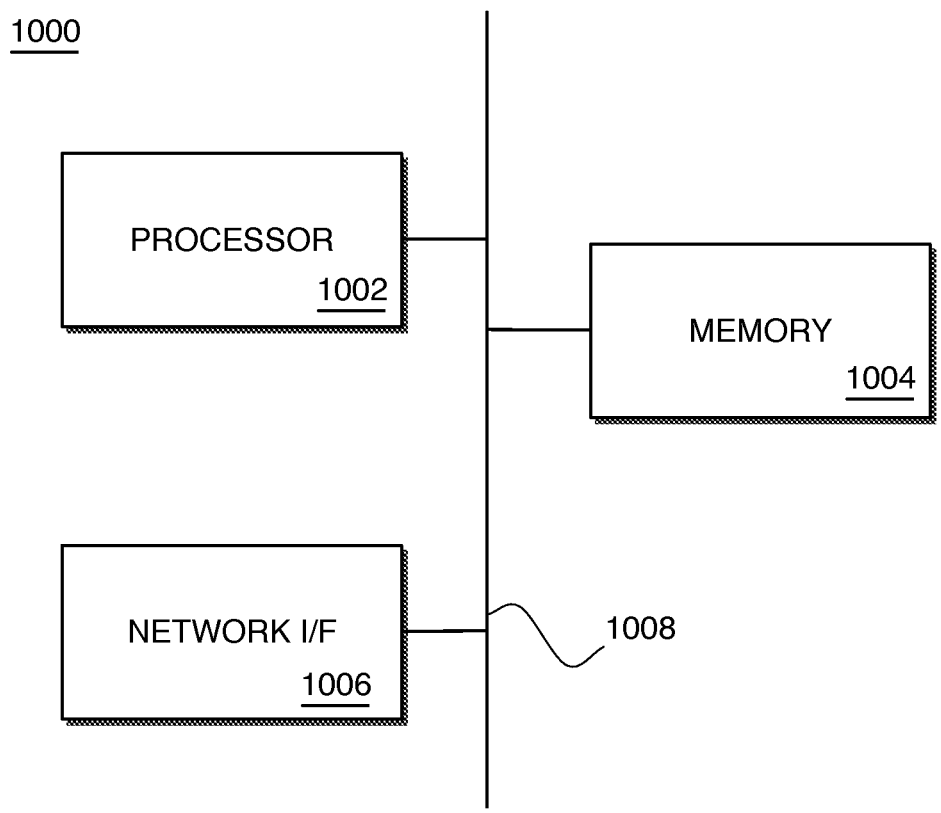
FIG. 10 is a high-level block diagram of a distributed trunk switch according to an embodiment.

FIG. 10 depicts a high-level functional block diagram of a DT switch 1000, such as one of DT switches 200, 202, according to an embodiment. DT switch 1000 comprises a processor 1002, a memory 1004, and a network interface (I/F) 1006 communicatively coupled via a bus 1008 or other interconnection communication mechanism.

Memory 1004 (also referred to as a computer-readable medium) may comprise a random access memory (RAM) or other dynamic storage device, coupled to the bus 1008 for storing communication data, and instructions to be executed by processor 1002. Memory 1004 also may be used for storing temporary variables or other intermediate information during execution of instructions to be executed by processor 1002. Memory 1004 may also comprise a read only memory (ROM) or other static storage device coupled to the bus 1008 for storing static information and instructions for the processor 1002. A storage device, such as a magnetic disk or optical disk, may also be provided and coupled to the bus 1008 for storing communication data, and instructions.

Network I/F 1006 comprises a mechanism for connecting the DT switch to a device, e.g., device 100, and another DT switch. Network I/F 1006 comprises a connection to a DT port and a DTI port. Network I/F 1006 also comprises, in at least some embodiments, a non-DT port.

The functions of a method described in connection with the embodiments disclosed herein may be embodied in hardware, software, or a combination thereof. Software comprising instructions for execution may reside in a computer-readable medium comprising volatile and/or non-volatile memory, e.g., a random access memory, a read only memory, a programmable memory, a hard disk, a compact disc, or another form of storage medium readable, directly or indirectly, by a processing device.

What is claimed is:

1. A method of transmitting an upstream communication packet from a distributed trunk (DT) switch, comprising:
    receiving a packet from a device connected to a DT port of a first DT switch and a DT port of a second DT switch by a distributed trunk having a first link connected to the DT port of the first DT switch and a second link connected to the DT port of the second DT switch; and
    transmitting the received packet via a non-DT port of the first DT switch if the first DT switch manages communication forwarding decisions with respect to the device and transmitting the received packet from the first DT switch, via a DT interconnect (DTI) port of the first DT switch, to the second DT switch if the first DT switch does not manage communication forwarding decisions with respect to the device.

2. The method as claimed in claim 1, wherein the transmitting comprises:
    determining whether the DT switch manages communication forwarding decisions with respect to of the device in accordance with an owner indicator.

3. The method as claimed in claim 1, further comprising:
    recording an ownership indicator with respect to at least one device connected to a DT port of at least one of the DT switches.

4. The method as claimed in claim 3, wherein the recording comprises:
    determining via communication with another DT switch whether the DT switch is to be designated to manage communication forwarding decisions with respect to the device.

5. The method as claimed in claim 1, further comprising:
    communicating with the second DT switch using a DT communication protocol.

6. The method as claimed in claim 5, wherein the communicating is
    performed over the DTI port.

7. The method as claimed in claim 5, wherein the communicating comprises:
    communication of packets comprising DT configuration information, link aggregation control protocol information, a priority key, and a transmission interval.

8. A method of transmitting a downstream communication packet received by a non-distributed trunk (non-DT) port of a first DT switch in a DT switch pair connected via a DT to a destination device, comprising:
    receiving a packet at a non-DT port of the first DT switch in the DT switch pair, wherein the received packet is destined for the destination device connected via a distributed trunk having a first link connecting a DT port of the first DT switch to the destination device and a second link connecting a DT port of a second DT switch of the DT switch pair to the destination device; and
    transmitting the received packet via the DT port of the first DT switch in the DT switch pair if the first DT switch manages communication forwarding decisions with respect to is the destination device.

9. The method as claimed in claim 8, further comprising:
    determining whether the DT switch manages communication forwarding decisions with respect to the destination device in accordance with an owner indicator.

10. The method as claimed in claim 8, wherein the transmitting comprises:
    recording an ownership indicator with respect to at least one device connected to a DT port of one of the DT switches.

11. The method as claimed in claim 10, wherein the recording comprises:
    determining via communication with the second DT switch whether the DT switch is to manage communication forwarding decisions with respect to the device.

12. A method of transmitting a downstream communication packet received by a non-distributed trunk (non-DT) port of a first DT switch in a DT switch pair connected via a DT to a device, comprising:
    receiving a communication packet at a non-DT port of the first DT switch in the DT switch pair, wherein the received packet is destined for a device connected via a distributed trunk having a first link connecting a DT port of the first DT switch to the device and a second link connecting a DT port of a second DT switch of the DT switch pair to the device; and transmitting the received communication packet via (a) the DT port of the first DT switch in the DT switch pair or (b) a distributed trunk interconnect (DTI) port of the first DT switch to the second DT switch in the DT switch pair, wherein transmission of the packet via (a) or (b) is based on a hash result.

13. The method as claimed in claim 12, further comprising:
recording an ownership indicator with respect to at least one device connected to a DT port of one of the DT switches.

14. The method as claimed in claim 12, further comprising:
hashing at least a portion of the received communication packet.

15. The method as claimed in claim 12, wherein the transmitting is performed for a received unicast communication packet.

16. The method as claimed in claim 15, further comprising:
transmitting the received communication packet via the DT port of one of the DT switch pair for a received communication packet other than a unicast communication packet.

17. A computer-readable medium storing instructions which, when executed by a processor, cause the processor to;
receive a packet from a device connected to a DT port of a first DT switch and a DT port of a second DT switch by a distributed trunk having a first link connected to the DT port of the first DT switch and a second link connected to the DT port of the second DT switch; and
transmit the received packet via a non-DT port of the first DT switch if the DT switch manages communication forwarding decisions with respect to the device and transmitting the received packet from the first DT switch, via a DT interconnect port of the first DT switch, to the second DT switch if the DT switch does not manage communication forwarding decisions with respect to the device.

18. A computer-readable medium storing instructions which, when executed by a processor, cause the processor to;
receive a packet a non-distributed trunk (non-DT) port of a first DT switch in a DT switch pair, wherein the received packet is destined for a device connected via a distributed trunk having a first link connecting a DT port of the first DT switch to the device and a second link connecting a DT port of a second DT switch of the DT switch pair to the device; and
transmit the received packet via the DT port of the first DT switch to the second DT switch in the DT switch pair if the first DT switch manages communication forwarding decisions with respect to the device.

19. A computer-readable medium storing instructions which, when executed by a processor, cause the processor to;
receive a communication packet at a non-distributed trunk (non-DT) port of a first DT switch in a DT switch pair, wherein the received packet is destined for a device connected via a distributed trunk having a first link connecting a DT port of the first DT switch to the device and a second link connecting a DT port of a second DT switch of the DT switch pair to the device; and
transmit the received communication packet via (a) the DT port of the first DT switch in the DT switch pair or (b) a distributed trunk interconnect (DTI) port of the first DT switch to the second DT switch in the DT switch pair, wherein transmission of the packet via (a) or (b) is based on a hash result.

* * * * *

UNITED STATES PATENT AND TRADEMARK OFFICE
CERTIFICATE OF CORRECTION

| | |
|---|---|
| PATENT NO. | : 8,964,746 B2 |
| APPLICATION NO. | : 12/032280 |
| DATED | : February 24, 2015 |
| INVENTOR(S) | : Shaun Wakumoto et al. |

It is certified that error appears in the above-identified patent and that said Letters Patent is hereby corrected as shown below:

In the Claims

In column 10, line 10, in Claim 2, delete "of the" and insert -- the --, therefor.

In column 10, line 47, in Claim 8, delete "is the" and insert -- the --, therefor.

Signed and Sealed this
Thirtieth Day of June, 2015

Michelle K. Lee
*Director of the United States Patent and Trademark Office*